(12) United States Patent
Pizzoni et al.

(10) Patent No.: US 12,259,028 B2
(45) Date of Patent: Mar. 25, 2025

(54) ROTARY MECHANICAL TRANSMISSION

(71) Applicant: UMBRAGROUP S.p.A., Foligno (IT)

(72) Inventors: Luciano Pizzoni, Foligno (IT); Nicola Borgarelli, Perugia (IT)

(73) Assignee: UMBRAGROUP S.P.A., Foligno (IT)

( * ) Notice: Subject to any disclaimer, the term of this patent is extended or adjusted under 35 U.S.C. 154(b) by 0 days.

(21) Appl. No.: 18/465,579

(22) Filed: Sep. 12, 2023

(65) Prior Publication Data
US 2024/0117864 A1    Apr. 11, 2024

(30) Foreign Application Priority Data
Oct. 7, 2022   (IT) .......................... 102022000020739

(51) Int. Cl.
*F16H 25/22*      (2006.01)
*B64C 13/38*      (2006.01)
*F16H 25/20*      (2006.01)

(52) U.S. Cl.
CPC .......... *F16H 25/2214* (2013.01); *B64C 13/38* (2013.01); *F16H 2025/2031* (2013.01); *F16H 2025/2078* (2013.01); *F16H 25/2247* (2013.01)

(58) Field of Classification Search
CPC ......... B64C 13/50; B64C 13/34; B64C 13/38; F16H 2025/2075; F16H 2025/204; F16H 2025/2204
See application file for complete search history.

(56) References Cited

U.S. PATENT DOCUMENTS

| 3,731,546 A | 5/1973 | MacDonald |
| 10,487,925 B2 * | 11/2019 | Muller .................... F16H 25/04 |
| 2015/0295468 A1 | 10/2015 | Pizzoni |

FOREIGN PATENT DOCUMENTS

WO    WO-2021069981 A1 *   4/2021   ............. B64C 13/28

OTHER PUBLICATIONS

Italian Search Report dated Mar. 17, 2023 from counterpart App No. IT 202200020739.

* cited by examiner

*Primary Examiner* — Gregory Robert Weber
(74) *Attorney, Agent, or Firm* — SHUTTLEWORTH & INGERSOLL, PLC; Timothy J. Klima

(57) ABSTRACT

A rotary mechanical transmission includes a containment structure, a first rotary element, connected or connectable to a drive unit to define a mechanical power input unit and rotatable about an axis of rotation, a fixed guide, a second rotary element rotatable about the axis of rotation and defining a power output unit and an intermediate roto-translational element, extending along the axis of rotation and including a first threaded portion, coupled to the first rotary element, and a second threaded portion, coupled to the fixed guide. The intermediate element is also coupled with the second rotary element by a linear guide parallel to the axis of rotation. The first threaded portion and the second threaded portion have different pitches and are at least partly separated along the axis of rotation. The intermediate element is defined by a hollow body and the second rotary element is inserted inside the intermediate element.

14 Claims, 4 Drawing Sheets

ROTARY MECHANICAL TRANSMISSION

CROSS-REFERENCE TO RELATED APPLICATIONS

This application claims priority to Italian Patent Application 102022000020739 filed Oct. 7, 2022, the entirety of which is incorporated by reference herein.

BACKGROUND OF THE INVENTION

This invention relates to a rotary mechanical transmission and is used in particular in the aeronautical field in particular in the control of the rotation of a propulsion system of an aircraft or in the control of the flight surfaces.

Rotary electro-mechanical actuators are known in the prior art comprising an electric motor and a transmission consisting, for example, of a screw and a lead nut or a series of gear wheels designed to vary the angular speed of a transmission output element.

Normally, many gears are necessary in order to obtain high reduction gears, often comprising gear wheel chains or, more generally, epicyclic gear mechanisms.

Disadvantageously, these transmission systems have some drawbacks in terms of reliability, efficiency and duration.

In general, the rotary transmission systems based on rotational mechanisms are characterised by a number of components which increases the greater the need is to increase the reduction ratio of the motion. This results in a considerable weight and dimensions of the entire transmission system which is therefore unsuitable for use in applications such as aeronautical ones.

A further drawback derives from the fact that the more components there are in the transmission system the greater will be the costs.

A further drawback is due to the fact that the greater the number components of the transmission system, the greater will be its complexity and consequently the lower will be its reliability and its efficiency.

A further drawback is due to the fact that the higher the reduction ratio which is to be obtained then the lower the overall efficiency of the system will be, especially at low temperatures.

A further drawback derives from the fact that the greater the number of components present in the transmission system then the less rigid the entire kinematic chain will be. Moreover, the use of gear trains also increases the extent of the "backlash", that is to say, the overall clearance between input and output.

A further drawback derives from the fact that, in order to guarantee a greater reduction ratio, some systems use sliding elements. This results in the presence of sliding friction and therefore a marked wear of the contact surfaces which causes a drastic reduction in the service life of the system.

Moreover, there are devices such as that described in patent application WO2021/069981A1 wherein the particular arrangement of the internal components of the mechanical transmission does not allow transmission ratios to be obtained which can guarantee high performance levels.

The technical purpose of the invention is therefore to provide a mechanical transmission which is able to overcome the drawbacks of the prior art.

The aim of the invention is therefore to provide a mechanical transmission which allows a compact and high performance actuator to be made.

A further aim of the invention is therefore to provide a mechanical transmission which allows the number of components present in the transmission system to be reduced whilst guaranteeing the possibility of implementing high or multiplication reduction ratios.

The technical purpose indicated and the aims specified are substantially achieved by a mechanical transmission comprising the technical features described in one or more of the accompanying claims. The dependent claims correspond to possible embodiments of the invention.

BRIEF SUMMARY OF THE INVENTION

In particular, the technical purpose and the aims specified are achieved by a mechanical rotary transmission comprising a containment structure, a first rotary element, connected or connectable to a drive unit to define a mechanical power input unit and rotatable about an axis, a fixed guide, in particular forming part of the containment structure and a second rotary element rotatable about the axis and defining a defining a power output unit.

The mechanical transmission also comprises an intermediate roto-translational element, extending along the axis of rotation and comprising a first threaded portion, coupled to the first rotary element, and a second threaded portion, coupled to the fixed guide.

The intermediate element is also coupled with the second rotary element by a linear guide parallel to the axis of rotation.

According to an aspect of this invention, the first threaded portion and the second threaded portion have different pitches and are at least partly separate along the axis of rotation.

According to an aspect of the invention, the intermediate element is defined by a hollow body and the second rotary element is inserted inside the intermediate element.

According to an aspect of the invention, the fixed guide is positioned outside the intermediate element and the second threaded portion is defined on an outer surface of the intermediate element.

According to an aspect of the invention, the first rotary element is defined by a hollow shaft positioned around the intermediate element and the first threaded portion is defined on an outer surface of the intermediate element.

According to an aspect of this invention, the first threaded portion has a smaller pitch than the second threaded portion.

According to an aspect of this invention, the first threaded portion is at least partly superposed on the second threaded portion.

According to an aspect of the invention, the containment structure comprises an end portion, preferably removable, forming a service compartment designed to receive the intermediate body in a sliding fashion.

According to an aspect of the invention, the fixed guide is positioned outside the service compartment, in particular in a position axially outside the service compartment.

According to further aspect of the invention, the service compartment is free of supports for the first rotary element and for the intermediate element.

Preferably, the size of the service compartment, along the axis, is equal to or greater than the stroke of the intermediate element.

According to an aspect of the invention, at least one between the first and the second threaded portions, preferably both, are defined by a recirculating ball screw or rollers.

According to an aspect of the invention, the linear guide is defined by a splined or recirculating ball connection.

The technical purpose indicated and the aims specified are also achieved by a rotary actuator comprising a mechanical transmission described above, and an electric motor integrated in the containment structure and having a stator positioned outside the first rotary element and a rotor integral with or integrated with the first rotary element.

According to an aspect of the invention, the electric motor is of the brushless type and the rotor is formed by a plurality of permanent magnets with axial extension angularly distributed about the axis of rotation.

In use, the above-mentioned actuator is used for varying the orientation of a propulsion system or for controlling the flight surfaces of a vehicle in an aeronautical context.

BRIEF DESCRIPTION OF THE SEVERAL VIEWS OF THE DRAWINGS

Further features and advantages of the invention are more apparent in the non-limiting description which follows of a non-limiting embodiment of a mechanical transmission which will be described below with reference to the accompanying drawings, which are provided solely for purposes of illustration, in which.

DETAILED DESCRIPTION OF THE INVENTION

Figure 1:
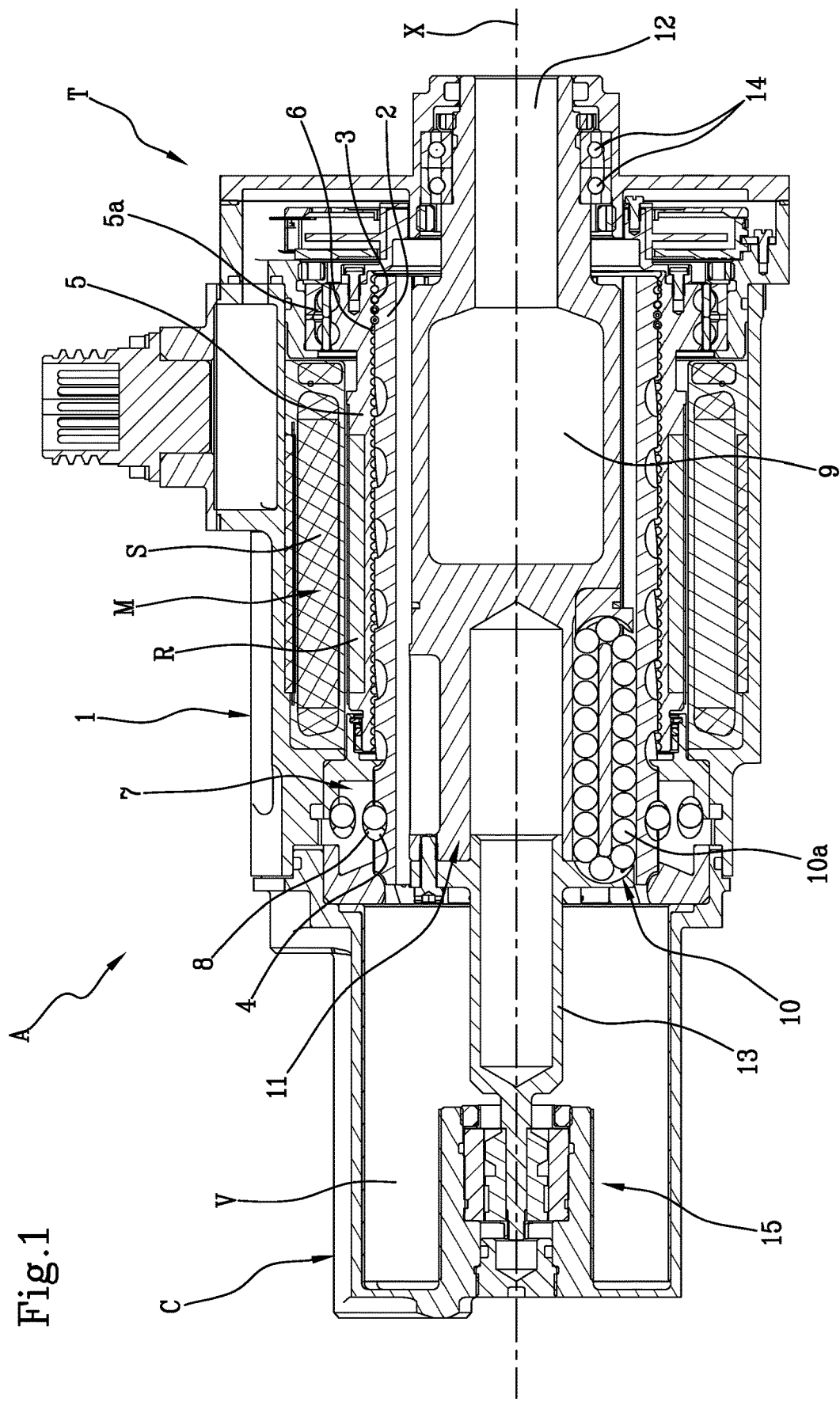
FIG. 1 is a cross-section of a mechanical transmission according to the invention in a first configuration of use.
Figure 2:
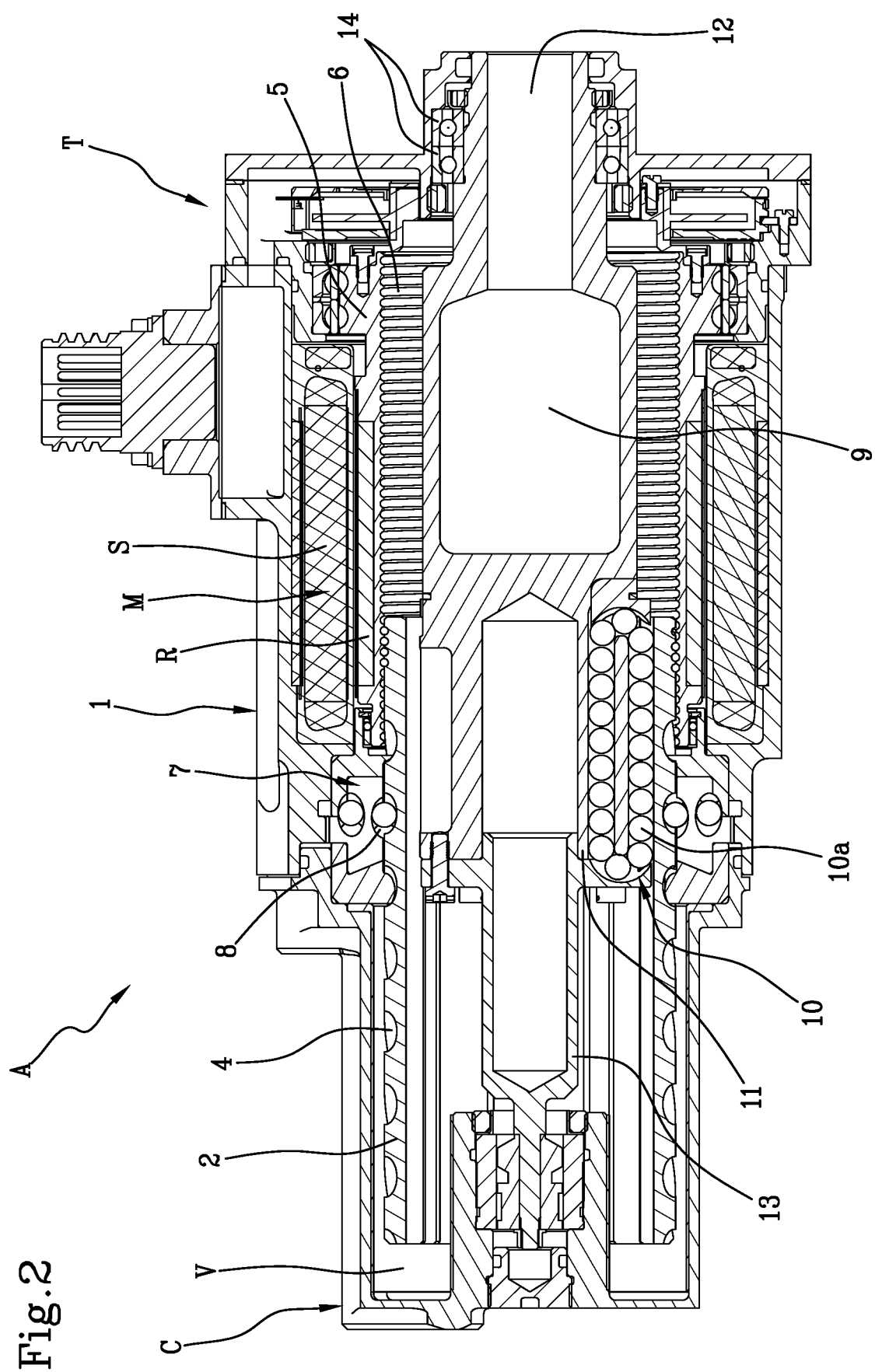
FIG. 2 is a cross-section of the mechanical transmission according to the invention in a second configuration of use.

FIG. 1 and FIG. 2 illustrate a rotary actuator "A", that is to say, an actuator which transforms a rotary motion having a certain angular speed into a rotary motion having a lower angular speed.

The rotary actuator "A" basically comprises an electric motor "M" and a rotary mechanical drive "T" for achieving a very high reduction ratio.

The mechanical transmission "T" comprises a containment structure 1, preferably substantially cylindrical in shape, and an intermediate element 2 extending along an axis of rotation "X". The intermediate element 2 is made in the form of a roto-translational element in such a way as to translate along the axis "X" and simultaneously rotate about the axis "X".

The intermediate element 2 comprises a first threaded portion 3 and a second threaded portion 4.

Figure 3:
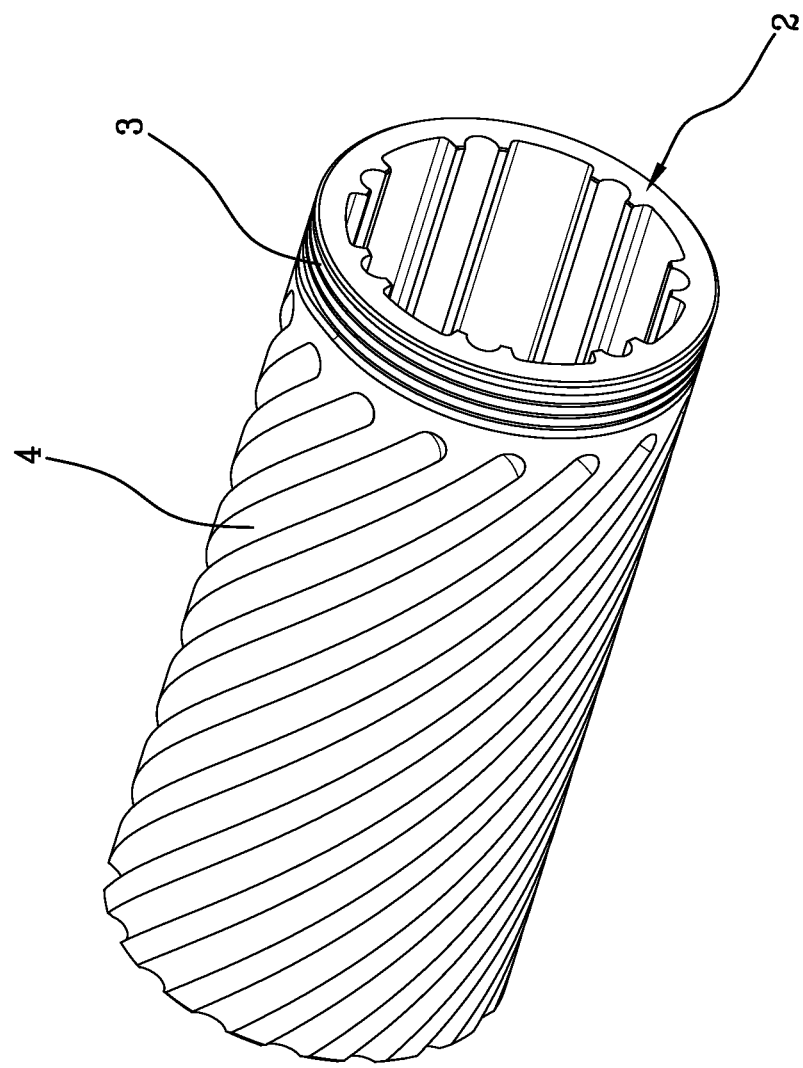
FIGS. 3 and 4 are perspective views of elements of the mechanical transmission of FIGS. 1 and 2.
Figure 4:
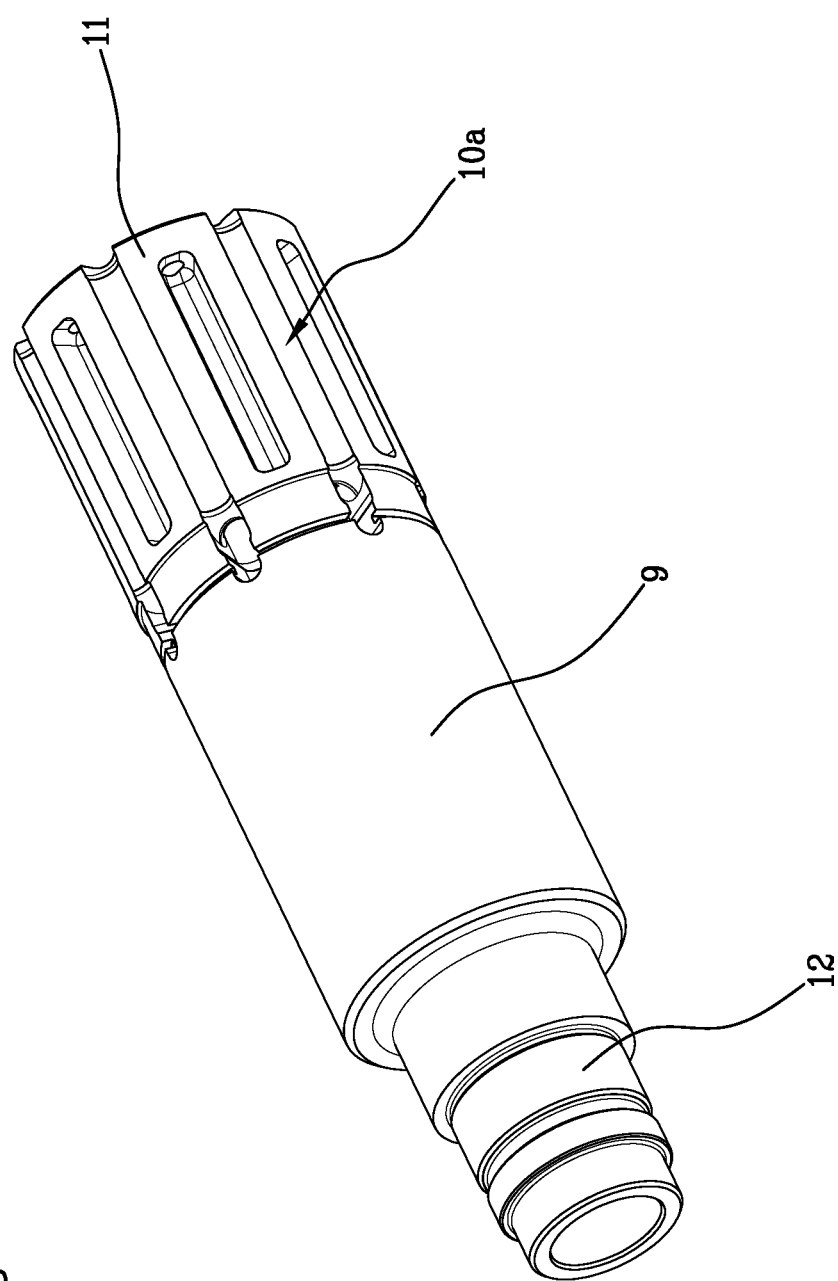

As illustrated in particular in FIG. 3, the intermediate element 2 is made in the form of a hollow body having a constant diameter.

The mechanical transmission "T" also comprises a first rotary element 5 connected or connectable to a drive unit "M" to define a mechanical power input unit. The first rotary element 5 is also rotatable about the axis of rotation "X".

According to the embodiment of FIG. 1, the first rotary element 5 is made in a hollow form in such a way as to be able to position itself around the intermediate element 2, more precisely it is made in the form of a mechanical lead nut with a hollow tubular shape and threaded internally.

In other words, the first rotary element 5 is defined by a hollow shaft positioned around the intermediate element 2 and the first threaded portion 3 is defined on an outer surface of the intermediate element 2.

The first rotary element 5 is in effect equipped internally with a first thread 6 designed to engage rotatably with the first threaded portion 3 of the intermediate element 2 in particular by means of a lead nut and screw or recirculating ball or roller coupling in such a way as to define a first threaded connection 3, 6 of the helical type.

Preferably, the first thread 6 has an axial extension greater than that of the first threaded portion 3 in such a way as to define a track along which the intermediate element 2 can move.

In particular, the first thread 6, coupled to the first threaded portion 3 of the intermediate element 2, has an extension equal to the stroke of the intermediate element 2 plus the length of the first threaded portion 3. In this way, the intermediate element 2 is able to move with a stroke equal to its length plus the length of the first threaded portion 3 as shown for example in FIG. 2.

The first rotary element 5 is mounted inside the mechanical transmission "T" in such a way as to be axially locked and therefore not able to translate along a direction parallel to the axis "X" but only able to perform a rotational movement about the axis "X".

In other words, the first rotary element 5 is positioned about the intermediate element 2 in such a way that the first thread 6 enters rotatably into contact with the first threaded portion 3 of the intermediate element 2 defining the first threaded connection 3, 6.

Preferably, the first rotary element 5 is axially locked thanks to the presence, respectively, of ball bearings 5a and roller bearings.

The mechanical transmission "T" also comprises a fixed guide 7 forming part of the containment structure 1. In particular, the fixed guide 7 is defined on an end portion "C" of the containment structure 1.

The fixed guide 7 has a second thread 8 designed to engage with the second threaded portion 4 of the intermediate element 2 in such a way as to define a second threaded connection 4, 8 which may be made in the form of a lead nut and screw or recirculating ball or roller connection.

Preferably and as shown in the accompanying drawings, the second threaded connection 4, 8 is a helical recirculating ball type connection.

For this reason, the second threaded portion 4 is coupled to the fixed guide 7.

Preferably, the second thread 8 has an axial extension less than that of the second threaded portion 4 in such a way as to guarantee an axial movement of the intermediate element 2.

Preferably, and as shown in the accompanying drawings, the fixed guide 7 is positioned outside the intermediate element 2 and the second threaded portion 4 is defined on an outer surface of the intermediate element 2.

Both the first threaded connection 3, 6 and the second threaded connection 4, 8 are therefore made on the outer surface of the intermediate element 2.

The first threaded portion 3 and the second threaded portion 4 have different pitches and are at least partly separated along the axis of rotation "X". In other words, the first threaded connection 3, 6 and the second threaded connection 4, 8 have different pitches from each other.

Preferably, the first threaded portion 3 is at least partly superposed on the second threaded portion 4.

Preferably, the first threaded portion 3 has a smaller pitch than the second threaded portion 4. In other words, the first threaded connection 3, 6 has a smaller pitch than the second threaded connection 4, 8.

Since the first threaded connection 3, 6 and the second threaded connection 4, 8 have different pitches from each other, they allow a variation in the angular speed between the intermediate element 2 and the first rotary element 5.

A rotation of the first rotary element 5 therefore corresponds to a roto-translation of the connecting element 2 the angular speed of which is less, in the case of transmission with a reduction in the transmission ratio, than that of the first rotary element 5 and as a function of the values of the pitches of the first and the second threaded connection.

On the other hand, in the case of transmission with an increase in the transmission ratio, a speed of rotation of the intermediate element 2 is obtained greater than that of the first rotary element 5.

The mechanical transmission "T" also comprises a second rotary element 9 rotatable about the axis "X" and defining a mechanical power output element.

The second rotary element 9 is rotatably connected to the connecting element 2 to rotate about the axis "X" and is inserted inside the intermediate element 2.

In particular, the intermediate element 2 is coupled with the second rotary element 9 by a linear guide 10 parallel to the axis of rotation "X".

The second rotary element 9 is therefore connected to an inner surface of the intermediate element 2 by an annular portion 11 in such a way that the intermediate element 2 is axially slidable relative to the second rotary element 9.

Preferably, the linear guide 10 is defined by a splined or recirculating ball connection 10a in such a way that the rotational motion of the intermediate element 2 is transmitted to the second rotary element 9. More in detail, the balls of the recirculating ball screw 10a are recirculated along the longitudinal grooves of the linear guide 10 of the annular portion 11 of the second rotary element 9.

Preferably, the second rotary element 9 also has an engagement portion 12 opposite to the annular portion 11 but rotatably integral with it. The engaging portion 12 is configured for engaging with a mechanical load.

According to the embodiment illustrated, the second rotary element 9 is associated, on the side opposite the power output, with an extension unit 13 (which is optional) operatively associated with a sensor of the rotation of the second rotary element 9. The extension element 13 has a substantially tubular or rod-like shape and extends along the axis of rotation "X". In particular, the extension member 13 is coaxial with the second rotary element 9.

Preferably, the second rotary element 9 is axially locked by mounting one or more bearings 14, preferably positioned at one end of the second rotary element 9 defining the power output (opposite the direction of maximum axial excursion of the intermediate element 2). The axial locking action does not require high axial reactions since, theoretically, the only axial action transmitted on the second rotary element 9 by the intermediate element 2 is due to the friction (of reduced extent) of the balls of the linear guide 10.

As shown in the accompanying drawings, the containment structure 1 comprises an end portion "C" defining a service compartment "V" designed to receive the intermediate body 2 in a sliding fashion.

The end portion "C" is preferably removable from the rest of the containment structure 1.

Preferably, and as shown in the accompanying drawings, the fixed guide 7 is positioned outside the service compartment "V" in such a way as to guarantee a sliding of the intermediate element 2.

Preferably, the service compartment "V" is free of supports for the first rotary element 5 and for the intermediate element 2. In this way, the service compartment "V" does not have dimensions which would prevent a sliding of the intermediate element 2 along a total dimension of the service compartment "V".

As shown in the accompanying drawings, the extension unit 13 is at least partly formed in the service compartment "V" but its presence does not obstruct the sliding movement of the intermediate element 2 along the axis "X", as it is radially included in the overall dimensions of movement of the intermediate element 2. Preferably, the service compartment "V" comprises a containment structure 15, with a cup shape, provided with suitable elements to allow the connection with the extension element 13 (where present) and to block the pushing action of the second rotary element 9. For this reason, the extension member 13 extends from the second rotary element 9 to an end portion of the service compartment "V" along the axis of rotation "X".

Preferably, the service compartment "V" has a dimension, along the axis of rotation "X", equal to or greater than the stroke of the intermediate element 2.

Advantageously, the presence of a service compartment "V" entirely available to receive in a sliding fashion the intermediate element 2 allows a high level of sliding of the intermediate element 2.

In this way, the mechanical transmission "T" makes it possible to obtain a transmission ratio greater than that of the mechanical transmissions (that is, of the rotary actuators) present in the prior art.

In use, the different pitches of the first threaded connection 3, 6 and of the second threaded connection 4, 8 make it possible to vary the angular speed between the intermediate element 2 and the first rotary element 5 and the second rotary element 9 is rotatably connected to the connecting element 2 to rotate about the axis "X" at the same rotary speed as the intermediate element 2.

Thanks to the greater stroke which can be achieved by the connecting element 2, due to the fact that the second rotary element 9 is positioned inside the connecting element 2 and therefore does not constitute an obstruction for the connecting element 2, it is possible to reduce the speed of rotation of the connecting element 2 thus improving the transmission ratio.

In other words, the greater stroke of the connecting element 2 makes it possible to increase the torque, with respect to the actuators present in the prior art, with the same motor or to use a smaller and faster motor with the same torque.

According to the embodiment illustrated in the accompanying drawings, the drive unit is represented by a rotor "R" of an electric motor "M" (for example made by means of permanent magnets) integrated in the containment structure 1 and having a stator "S" positioned outside the first rotary element 5.

In particular, the electric motor "M" has a rotor "R" integral with or integrated with the first rotary element 5.

The electric motor "M" may be of the brushless type and the rotor "R" is formed by a plurality of permanent magnets with axial extension angularly distributed about the axis of rotation "X".

In use, the rotary actuator "A" as described above is used for varying the orientation of a propulsion system of a vehicle in the aeronautical field.

The invention achieves the above-mentioned aims, eliminating the drawbacks highlighted in the prior art.

In effect, the structure of the mechanical transmission "T" described and claimed in this way allows high reduction ratios to be obtained without there being the need to increase the overall size and weight of the transmission adding mechanical gear or kinematic mechanisms such as, for example, gear wheels. This advantage makes the mechanical transmission "T" excellent for applications on aircraft.

Moreover, the positioning of the second rotary element 9 inside the intermediate element 2 allows the overall dimensions to be reduced allowing a greater stroke of the intermediate element 2 which allows improved transmission ratios to be obtained.

The mechanical transmission "T" therefore allows a compact and high performing actuator to be made.

A further advantage derives from the fact that the mechanical transmission "T" is less complex than traditional transmissions and, therefore, a better mechanical efficiency, especially at low temperatures.

A further advantage derives from the fact that, even in order to reach high transmission ratios, the mechanical transmission "T" requires a smaller number of components making the entire transmission more reliable.

A further advantage derives from the fact that the mechanical transmission "T" has a smaller "backlash" and a greater rigidity since there are no chains and gear wheels.

A further advantage derives from the fact that the transmission system, in its normal operation, does not comprise sliding elements. The absence of sliding friction therefore guarantees a greater service life of the mechanical transmission "T".

A further advantage derives from the fact that the mechanical transmission "T" makes it possible to create a reduction ratio such as to reduce the torque required for the drive unit of the rotary actuator "A" and increase its speed of rotation without using gear boxes but simply by varying the pitch of the first and the second threaded connection.

The invention claimed is:

1. A rotary mechanical transmission, comprising:
a containment structure;
a first rotary element, connected or connectable to a drive unit to define a mechanical power input unit and rotatable about an axis;
a fixed guide forming part of said containment structure,
a second rotary element rotatable about said axis of rotation and defining a power output unit;
a roto-translational intermediate element, extending along said axis of rotation and comprising a first threaded portion, coupled to said first rotary element, and a second threaded portion, coupled to said fixed guide, said intermediate element being also coupled with said second rotary element by a linear guide parallel to said axis of rotation;
wherein the first threaded portion and the second threaded portion have different pitches and are at least partly separated along said axis of rotation; and
wherein said intermediate element is defined by a hollow body and said second rotary element is inserted inside the intermediate element.

2. The mechanical transmission according to claim 1, wherein said fixed guide is positioned externally relative to said intermediate element and wherein said second threaded portion is defined on an outer surface of the intermediate element.

3. The mechanical transmission according to claim 1, wherein said first rotary element is defined by a hollow shaft positioned around said intermediate element and wherein said first threaded portion is defined on an outer surface of the intermediate element.

4. The mechanical transmission according to claim 1, wherein said first threaded portion has a smaller pitch than the second threaded portion.

5. The mechanical transmission according to claim 1, wherein said first threaded portion is at least partly superposed on said second threaded portion.

6. The mechanical transmission according to claim 1, wherein said containment structure comprises an end portion defining a service compartment configured to receive in sliding said intermediate body.

7. The mechanical transmission according to claim 6, wherein said service compartment has a dimension, along the axis of rotation, equal to or greater than a stroke of the intermediate element.

8. The mechanical transmission according to claim 6, wherein said end portion is removable.

9. The mechanical transmission according to claim 6, wherein said fixed guide is positioned outside the service compartment.

10. The mechanical transmission according to claim 6, wherein said service compartment is free of supports for said first rotary element and for said intermediate element.

11. The mechanical transmission according to claim 1, wherein at least one of said first and second threaded portions is defined by a recirculating ball or rollers.

12. The mechanical transmission according to claim 1, wherein said linear guide is defined by a splined or recirculating ball connection.

13. A rotary actuator comprising the mechanical transmission according to claim 1, and an electric motor integrated in the containment structure and having a stator positioned outside the first rotary element and a rotor integral with said first rotary element.

14. The rotary actuator according to claim 13, wherein said electric motor is brushless and said rotor is defined by a plurality of permanent magnets with axial extension angularly distributed around said axis of rotation.

* * * * *